United States Patent
Factor et al.

(10) Patent No.: US 7,757,015 B2
(45) Date of Patent: Jul. 13, 2010

(54) DEVICE, METHOD AND COMPUTER PROGRAM PRODUCT READABLE MEDIUM FOR DETERMINING THE IDENTITY OF A COMPONENT

(75) Inventors: Michael Factor, Haifa (IL); Thomas Charles Jarvis, Tucson, AZ (US); Robert Akira Kubo, Tucson, AZ (US); Orit Nissan-Messing, Hod HaSharon (IL); Gary Valentin, Tel Aviv (IL); Elena Yerushalmi, Hertzeliya (IL); Aviad Zlotnick, D.N. Lower Galilee (IL)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 11/225,738

(22) Filed: Sep. 13, 2005

(65) Prior Publication Data

US 2007/0073907 A1  Mar. 29, 2007

(51) Int. Cl.
*G05B 23/00* (2006.01)
(52) U.S. Cl. .......................... 710/17; 710/36
(58) Field of Classification Search .............. 711/1, 711/162; 710/6; 714/5, 6, 507, 665, 50, 714/766, 4, 7, 770, 25; 707/202; 709/220
See application file for complete search history.

(56) References Cited

U.S. PATENT DOCUMENTS

| | | | | |
|---|---|---|---|---|
| 5,548,743 | A * | 8/1996 | Sugiyama et al. | 711/152 |
| 5,568,609 | A * | 10/1996 | Sugiyama et al. | 714/43 |
| 5,974,474 | A | 10/1999 | Furner et al. | |
| 6,463,550 | B1 * | 10/2002 | Cepulis et al. | 714/25 |
| 6,516,425 | B1 * | 2/2003 | Belhadj et al. | 714/6 |
| 6,564,318 | B1 * | 5/2003 | Gharda et al. | 713/2 |
| 6,691,181 | B2 * | 2/2004 | Adams | 710/25 |
| 6,691,209 | B1 * | 2/2004 | O'Connell | 711/114 |
| 6,789,111 | B1 | 9/2004 | Brockway et al. | |
| 6,804,727 | B1 | 10/2004 | Rademacher | |
| 6,865,157 | B1 * | 3/2005 | Scott et al. | 370/242 |
| 6,986,075 | B2 * | 1/2006 | Ackaret et al. | 714/4 |
| 7,035,883 | B2 * | 4/2006 | Kezuka et al. | 707/205 |
| 7,076,686 | B2 * | 7/2006 | La Fetra | 714/6 |
| 7,085,857 | B2 * | 8/2006 | Rust et al. | 710/13 |
| 7,085,904 | B2 * | 8/2006 | Mizuno et al. | 711/162 |
| 7,219,260 | B1 * | 5/2007 | de Forest et al. | 714/15 |
| 7,254,575 | B1 * | 8/2007 | Li et al. | 707/3 |
| 7,373,208 | B2 * | 5/2008 | Ozaki et al. | 700/79 |
| 2004/0153741 | A1 * | 8/2004 | Obara | 714/7 |

* cited by examiner

*Primary Examiner*—Henry W. H. Tsai
*Assistant Examiner*—Cheng-Yuan Tseng

(57) ABSTRACT

Method, device and computer program product for determining a characteristic of an identifiable component. The method includes: receiving identification information representative of an identity of components that belong to a group of components, determining at least one characteristic of an identifiable component in response to the received identification information, and performing at least one characteristic responsive operation. The device includes an identifiable component and a component characteristic determiner. The component characteristic determiner is adapted to receive identification information representative of an identity of components that belong to a group of components and to determine at least one characteristic of the identifiable component in response to a relationship between the received identification information and reference identification information. The device is adapted to perform at least one characteristic responsive information.

13 Claims, 7 Drawing Sheets

DEVICE, METHOD AND COMPUTER PROGRAM PRODUCT READABLE MEDIUM FOR DETERMINING THE IDENTITY OF A COMPONENT

FIELD OF THE INVENTION

The present invention relates to methods, devices and computer program products that determine a characteristic of a component and especially to devices, methods and computer program products that determine the identity or the relative replacement time of the component.

BACKGROUND OF THE INVENTION

Many modern devices are managed by a system management software. The system management software is capable of determining the status of the device and especially the status of multiple components that are included within the device.

The system management software can determine the identity of the different components by reading the serial numbers of these components. These serial numbers are usually stored within local memory units that form a part of the components.

The serial number can be used for tracing the replacement of components, for licensing purposes and for warranty management.

If the local memory unit of a certain component is defective, if the serial number provided by a local memory unit is defective, or if the serial number can not be read from other reasons then the system management software can fail to identify the component.

Various devices require configuration information in order to operate in a proper manner. Some devices can store the configuration information in multiple components. If one of these components is replaced there is a need to determine which component stores the relevant configuration information.

There is a need to provide methods, systems and a computer readable products that can identify a characteristic of a component, especially when a component is defective or is replaced.

SUMMARY OF THE PRESENT INVENTION

Method, device and computer program product for determining a characteristic of an identifiable component. The method includes: receiving identification information representative of an identity of components that belong to a group of components, determining at least one characteristic of an identifiable component in response to the received identification information and performing at least one characteristic responsive operation.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
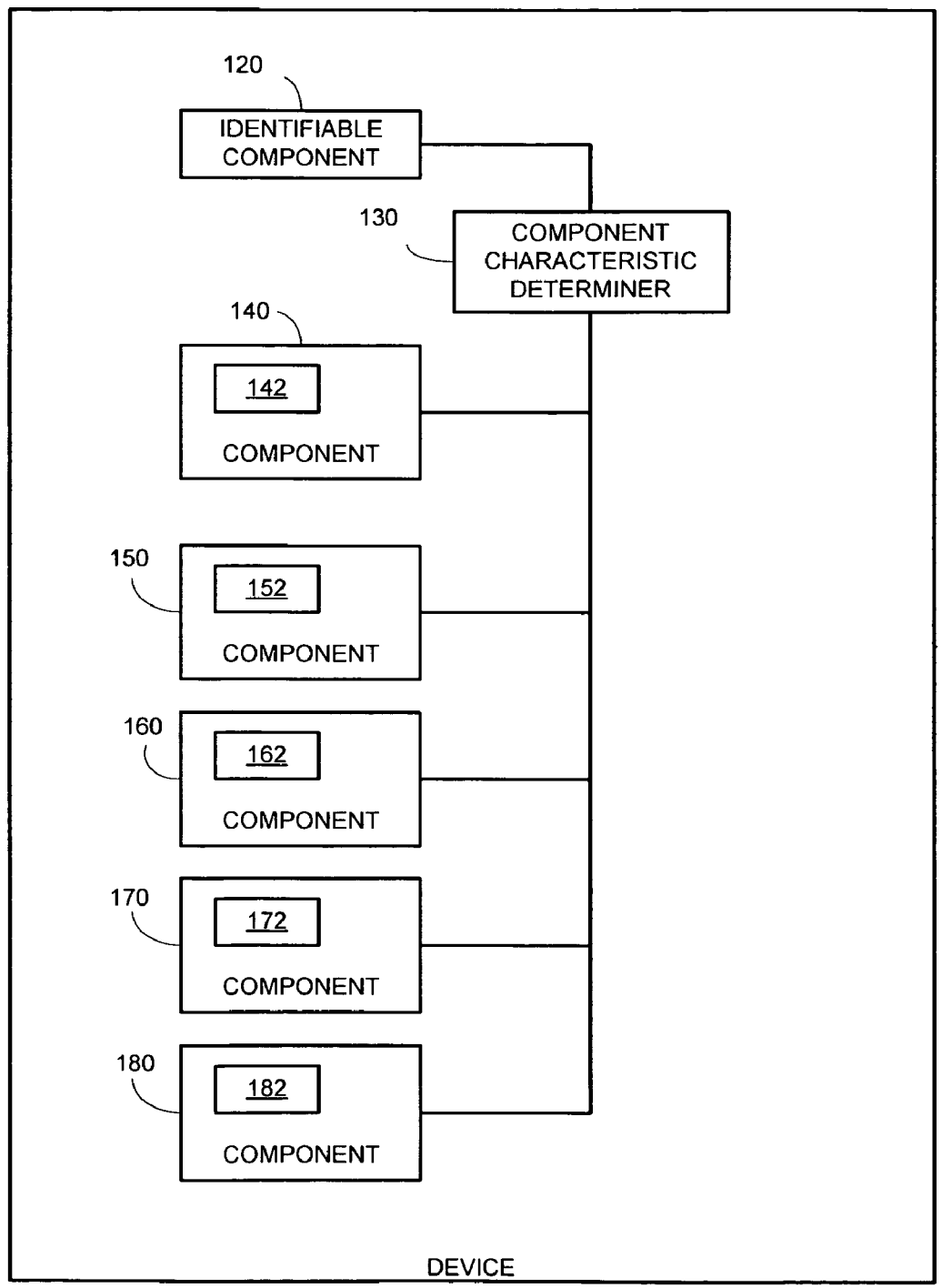
FIG. 1 is a schematic illustration of a device according to an embodiment of the invention.

Methods, devices and computer program products are provided. According to an embodiment of the invention the devices, methods and computer program products determine the identity (or another characteristic) of a component in response to identification information of other components. The identification information can be a serial number, but this is not necessarily so.

According to another embodiments of the invention the devices, methods and computer program products determine the identity (or another characteristic) of a component in response to a relationship between multiple versions of that component's identification information.

According to an embodiment of the invention the device, method and computer program product assist in determining which component out of multiple components was recently replaced, conveniently during a shut down period of a device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

FIG. 1 is a schematic illustration of a device 100 according to an embodiment of the invention.

Device 100 includes an identifiable component 120 and a component characteristic determiner 130. The component characteristic determiner 130 is adapted to receive identification information of a group of components (such as components 140-180) and to determine at least one characteristic of the identifiable component 120 in response to a relationship between the received identification information and reference identification information.

The identifiable component is the subject of a characteristic determination process. It can be belong to the group of components but this is not necessarily so.

Each components out of components 140-180 includes a local storage unit (142-182) that stores the identification information of that component. According to an embodiment of the invention one or more local storage units also stores identification information of the identifiable component. According to yet a further embodiment of the invention at least two local storage units store identification information of other components of the group of components.

FIG. 1 illustrates components 140-180 as being included within device 100 but this is not necessarily so.

According to an embodiment of the invention the component characteristic determiner 130 is part of the group of components but this is not necessarily so. The component characteristic determiner 130 can be a part of device 100 but this is not necessarily so.

Conveniently, the characteristic is the identity of the identifiable component but this is not necessarily so. For example, the characteristic can be the relative time of replacement of the identifiable component.

If various components (also referred to as configuration information storing components) store configuration information of device 100 then device 100 has to determine which of these configuration information storing components stores the relevant configuration information. This can be determined by storing, at each of the configuration information storing components, identification information of other components of the device. Once the device is initialized it can compare between the identification information stored at each configuration information storing components and between the identification information it receives from other components.

According to an embodiment of the invention device 100 can select between multiple determination policies and apply the selected determination policy. The selection can be predefined, responsive to stored selection information and the like. Conveniently, the device 100 can send a request to receive selection information from a user and in response receive the selection information.

According to an embodiment of the invention device 100 can determine a characteristic of the identifiable component in response to the identification information received from other components only if the identity information of the identifiable component is faulty, or can not be read.

The identity information of the identifiable component can be stored at a local memory unit that belongs to the identifiable component or at a local memory unit that belongs to another component.

Conveniently, the device 100 generates the reference identification information during a primary initialization stage. According to another embodiment of the invention the device 100 does not generate this reference identification information but later receives it from another source.

Conveniently, each component of the group is associated with a component identification information. Device 100 is adapted to determine the at least one characteristic of the identifiable component by comparing between received identification information of multiple components and reference identification information of multiple components.

Assuming, for example, that each component out of components 140-180 has a serial number then the device 100 can determine the identity of identifiable component 120 by comparing between the serial numbers of the components to reference serial numbers of reference components.

The result of the comparisons between the received serial numbers and the reference serial numbers can determine whether identifiable component 120 was replaced after the reference serial numbers were read.

One determination policy can include determining that identifiable component 120 was not replaced if a majority of serial numbers and corresponding reference serial numbers match. For example, if the groups of components includes five components (such as components 140, 150, 160, 170 and 180) then at least three matches are required in order to determine that the identifiable component 120 was not replaced.

Another determination policy can include determining that the identifiable component 120 was not replaced if the identification information of a largest sub-group of components match the corresponding reference component identification information. For example, if the group of components includes five components, two serial numbers match the corresponding reference serial numbers, and each of the other three serial numbers does not match any known reference serial number then the device 100 can still determine that identifiable component 120 was not replaced.

Yet other determination policies can be responsive to weight factors assigned to the serial numbers. Thus, a certain serial number's match can be more significant than another serial number's mismatch.

According to an embodiment of the invention components 140-180 can also store identification information of identifiable component 120, such as its serial number. In such a case a determination policy can include comparing between the multiple versions of the serial number of the identifiable component 120 that are stored in components 140-180.

According to an embodiment of the invention each component out of components 140-180 can also store identification information of other components of the group. For example, component 140 can stores the serial number of components 150-180 to provide a set of serial numbers. In such a case one determination policy can include comparing between the sets of serial numbers that are stored in each component out of components 140-180 in order to determine whether one or more component out of 140-180 or even component 120 was replaced.

Figure 2:
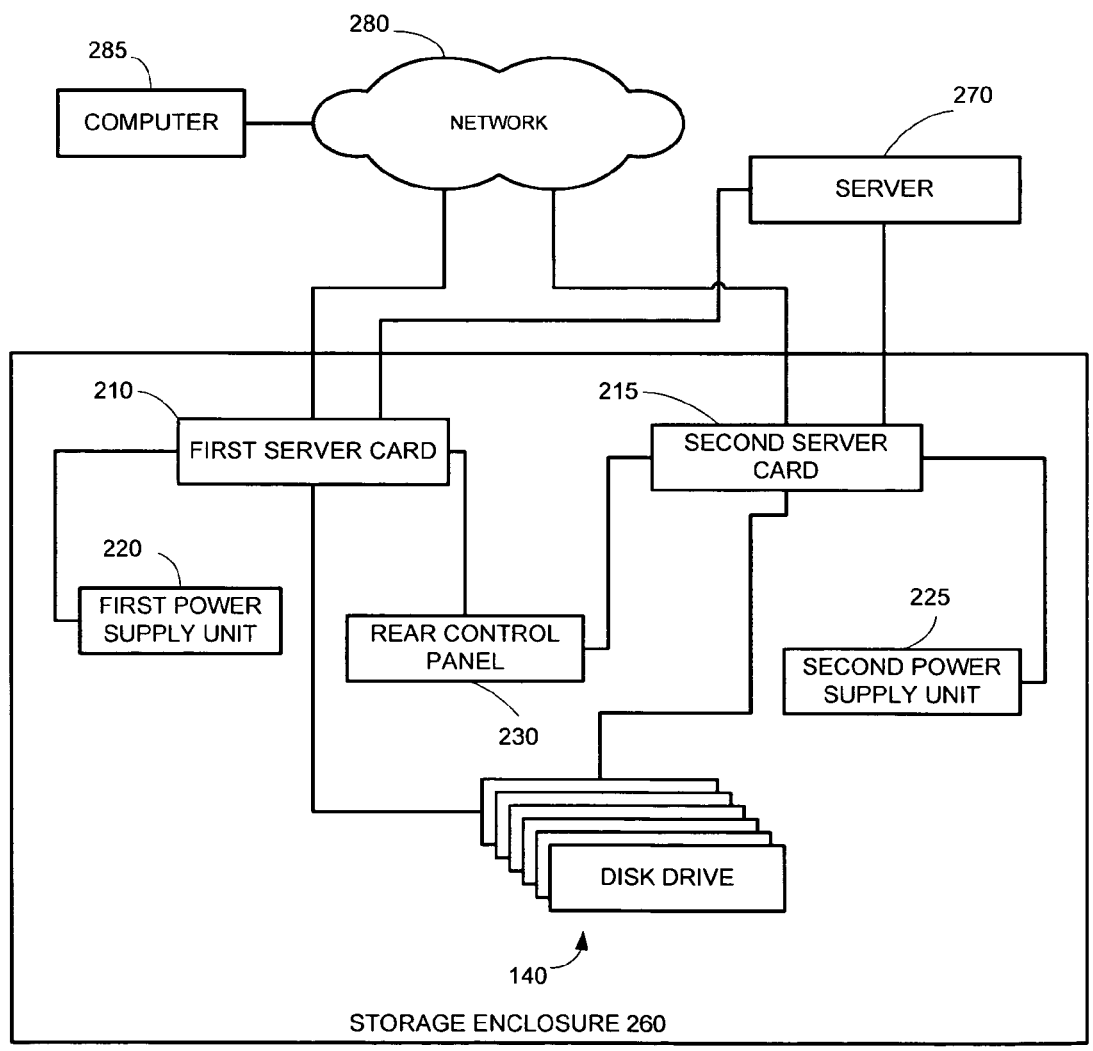
FIG. 2 is a schematic illustration of a device according to another embodiment of the invention.

FIG. 2 is a schematic illustration of device 200 according to another embodiment of the invention.

Device 200 is a storage device such as but not limited to a DS6000™ storage device of IBM®. Device 200 includes multiple components such as a first server card 210, a second server card 215, a first power supply unit 220, a second power supply unit 225, and a rear control panel 230. In addition, device 200 includes multiple disk drivers 240. Components 210-240 are enclosed by a storage enclosure 280.

Conveniently, the first and/or the second server cards 210 and 215 can operate as a component characteristic determiner 130. According to another embodiment of the invention the device 200 can transmit identification information to another entity, such as computer 285 or server 270 that can operate as the component characteristic determiner 130.

Each of the server cards 210 and 215 is connected to each of the multiple disk drivers 240. The first server card 210 and the second server card 215 are also connected to the first and second power supply units 220 and 225 and to the rear control panel 230.

Device 200 is connected, via network 280, to a computer 285. The computer 285 can execute a system management software that can provide the user of computer 285 indications about the status of device 200.

Each of the server cards 210 and 215 can determine one or more characteristic of the storage enclosure 260. The server cards 210 and 215 can also determine which server card stores the relevant configuration information. If one server card does not store the relevant configuration information it reads it from the other server card.

Device 200 is connected, via host I/O ports, to a server 270 that writes and reads information to and from the multiple disk drivers 240.

Device 200 can be connected, via expansion I/O ports, to multiple expansion enclosures (not shown), such as to increase the over storage volume of a system that includes device 200 and the multiple expansion enclosures.

Each component out of server cards 210 and 215, power supply units 220 and 225, and the rear control panel 230 stores the identification information of that component.

The serial number of the storage enclosure 260 is stored at the rear control panel 230. According to an embodiment of the invention the serial number of the storage enclosure can be stored at one or more additional components. According to yet another embodiment of the invention at least one component stores the identification information of other components.

Device 200 operates even if the rear control panel 230 is defective, is missing or provides a faulty storage enclosure serial number. In these cases the serial number of the server cards 210 and 215, the power supply units 220 and 225, and the rear control panel 230 are read in order to determine the identity of the storage enclosure 260.

According to various embodiments of the invention device 200 can perform at least one characteristic responsive operation after determining the identity of the storage enclosure 260. The characteristic responsive operation can include requesting to replace the rear control panel 230 if it does not store the expected serial number. Another characteristic responsive operation can include updating the user about the status of device 200. Yet further characteristic responsive operations can include storing the serial numbers of the storage enclosure 260 or of another component at one or more disk driver. Yet a further characteristic responsive operations can include updating a weight factor of one or more serial number, and the like.

Figure 3:
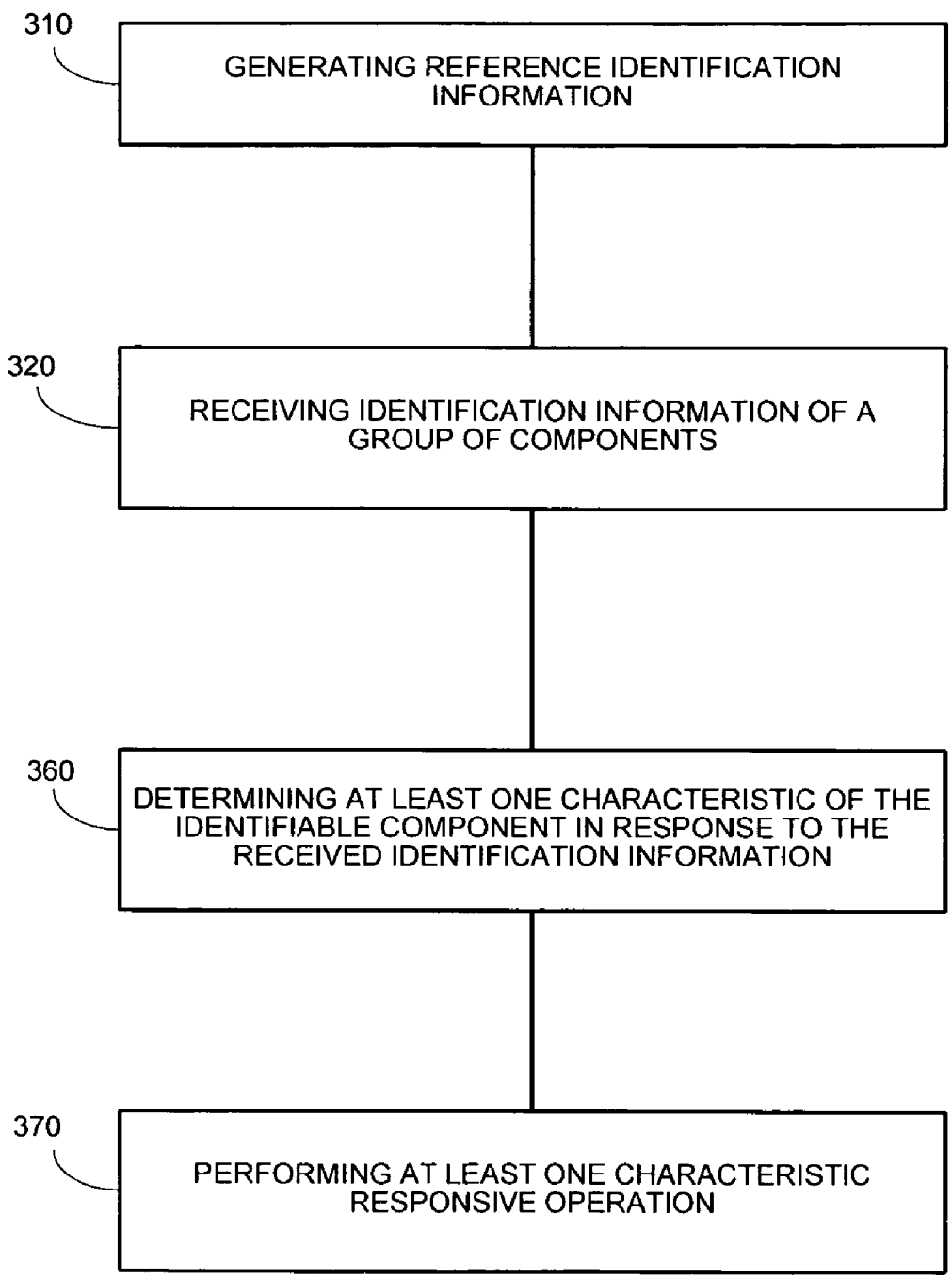
FIGS. 3-7 are flow charts of methods for determining a characteristic of an identifiable component according to various embodiments of the invention.

FIG. 3 is a flow chart of method 300 for determining a characteristic of an identifiable component according to an embodiment of the invention.

Method 300 starts by stage 310 of generating reference identification information. The identifiable component and components that belong to the group of components that are present during this stage are also referred to as reference identifiable component and reference components, accordingly.

If the identifiable component or one or more components of the group are replaced after the end of stage 310 then method 300 can detect the replacement. The identifiable component and conveniently one or more components of the group are included within a device.

Conveniently stage 310 is executed during a primary initialization stage. A primary initialization stage usually includes setting the configuration of the device, performing a first boot sequence and the like.

Stage 310 conveniently includes reading the identification information of multiple components and storing this identification information in one or more storage units that are conveniently persistent storage units. The identification information can be stored in multiple locations, for example in a redundant manner.

Stage 310 is followed by stage 320 receiving identification information of a group of components. Conveniently the identification information of each component is read from a local memory included within (or connected to) that component. Stage 320 is usually performed during an initialization stage of the device.

Stage 320 is followed by stage 360 of determining at least one characteristic of the identifiable component in response to the received identification information.

According to one embodiment of the invention the received identification information is representative of the identity of the components of the group.

Conveniently, stage 360 includes determining a relationship between the received identification information and reference identification information. Conveniently, the characteristic is an identity of the identifiable component.

According to an embodiment of the invention the characteristic is a relative replacement time of the identifiable component.

If multiple components, such as but not limited to configuration information storing components, can be replaced during a shutdown period then the relative replacement time of each configuration information storing components can assist in determining which configuration information storing component was replaced during the last shutdown period. Usually this replaced configuration information storing component will receive configuration information from another configuration information storing component having an earlier relative replacement time.

According to an embodiment of the invention stage 360 includes performing comparisons between received identification information of multiple components and reference identification information of multiple components.

Conveniently, stage 360 includes defining the identifiable component as the reference identifiable component if received component identification information of a majority of components match the corresponding reference identification information. Thus, method 300 determines that the identifiable component was not replaced if most of the components were present when the reference identification information was generated.

According to another embodiment of the invention stage 360 includes defining the identifiable component as the reference identifiable component if received identification information of a largest sub-group of components match corresponding reference identification information. Thus, method 300 determines that the identifiable component was not replaced if the largest sub-group of components were present when the reference identification information was generated.

According to an embodiment of the invention the determination can also be responsive to weight factors assigned to different components. If, for example, a certain component is more reliable than another component then a match between the received identification information and the reference component identification information of that component can be more significant than a match between the corresponding identification information of the other component.

It is noted that the weight factor can also be responsive to other factors than the reliability of each component. For example, if the component tends to be replaced with an identifiable component then the former component should be assigned with a relatively high weight factor.

Stage 360 is followed by stage 370 of performing at least one characteristic responsive operation. The characteristic responsive operation can include determining if a component other than the identifiable component was replaced, determining which component stores the relevant configuration information, copying the relevant configuration information, updating the status of a device, transmitting the identity of the identifiable component, storing the identity information of the identifiable component, ignoring identity information of an identifiable component that is rendered invalid or improper, requesting a replacement of the identifiable component, and the like.

Figure 4:
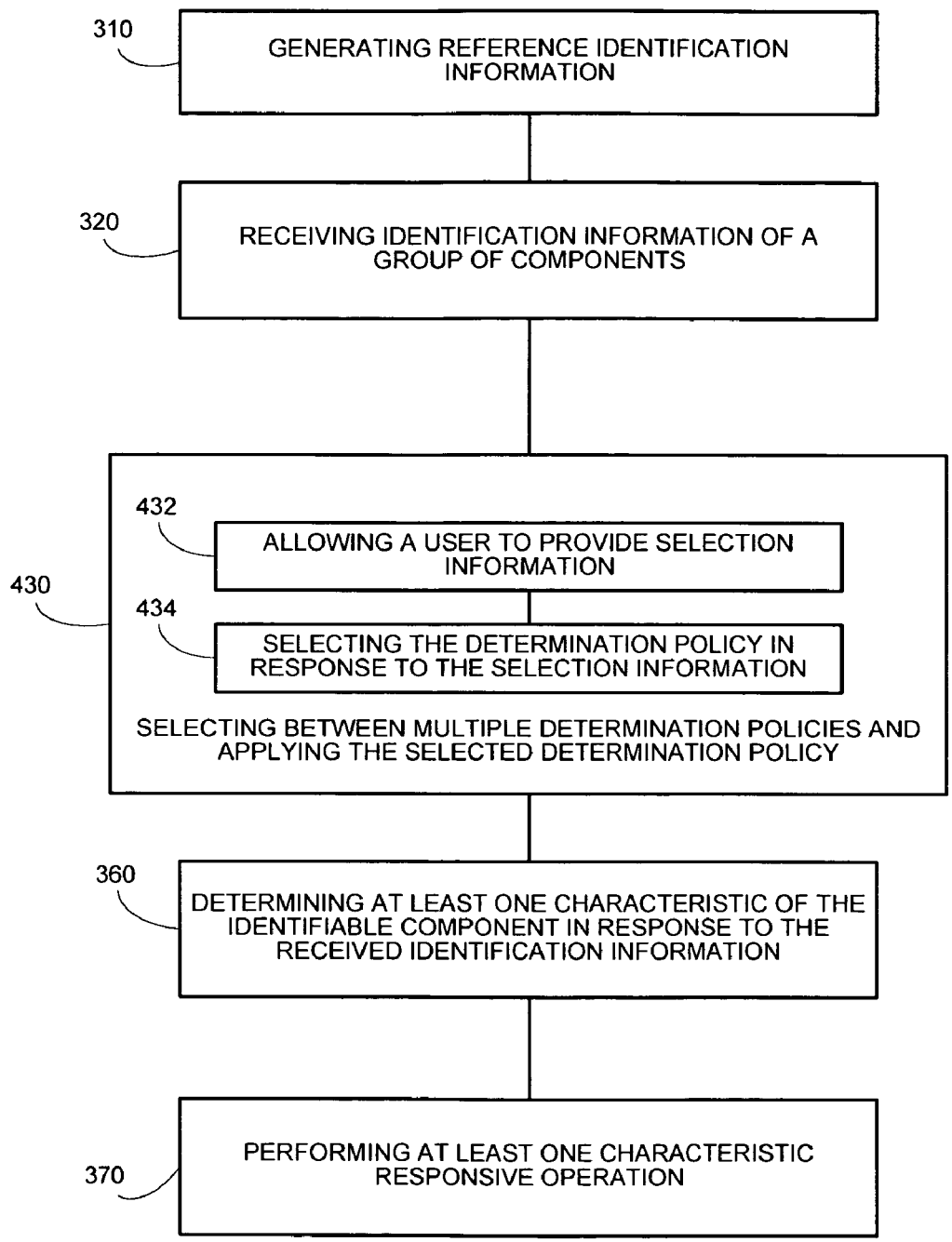

FIG. 4 is a flow chart of method 400 for determining a characteristic of an identifiable component according to an embodiment of the invention Method 400 differs from method 300 by further including stage 430. Stage 430 follows stage 320 and precedes stage 360.

Stage 430 includes selecting between multiple determination policies and applying the selected determination policy. Conveniently, stage 430 may include stage 432 of allowing a user to provide selection information and stage 434 of selecting the determination policy in response to the selection information. Stage 332 can include displaying to the user a request to enter selection information, but this is not necessarily so. Conveniently, the policy is determined during a setup stage, prior to the appliance of the determination policy.

Figure 5:
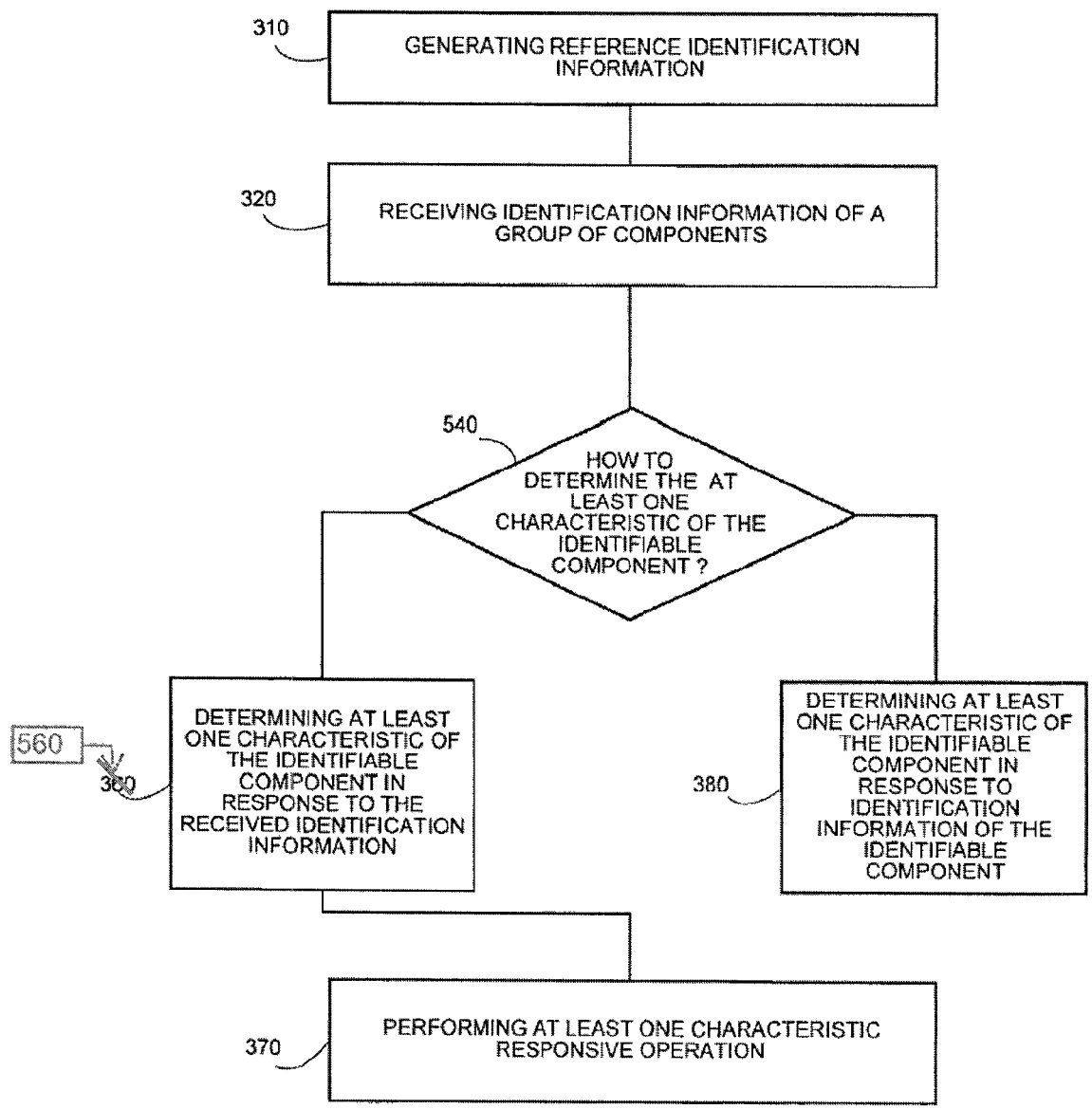

FIG. 5 is a flow chart of method 500 for determining a characteristic of an identifiable component according to an embodiment of the invention.

Method 500 differs from method 300 by further including stage 540. Stage 540 follows stage 320 and includes determining whether to determine the characteristic of the identifiable component in response to the received identification information of the components of the group (jump to stage 560) or determining the at least one characteristic in response to the identification information of the identifiable component (jump to stage 380). Stages 380 and 360 are followed by stage 370.

If, for example, a received identification information of the identifiable component is valid or if the received identification information of the group of components is valid then method 500 can jump to stage 380. It is noted that the validity of the identification information can be checked by comparing the format of the identification information to a predefined format, and the like.

Figure 6:
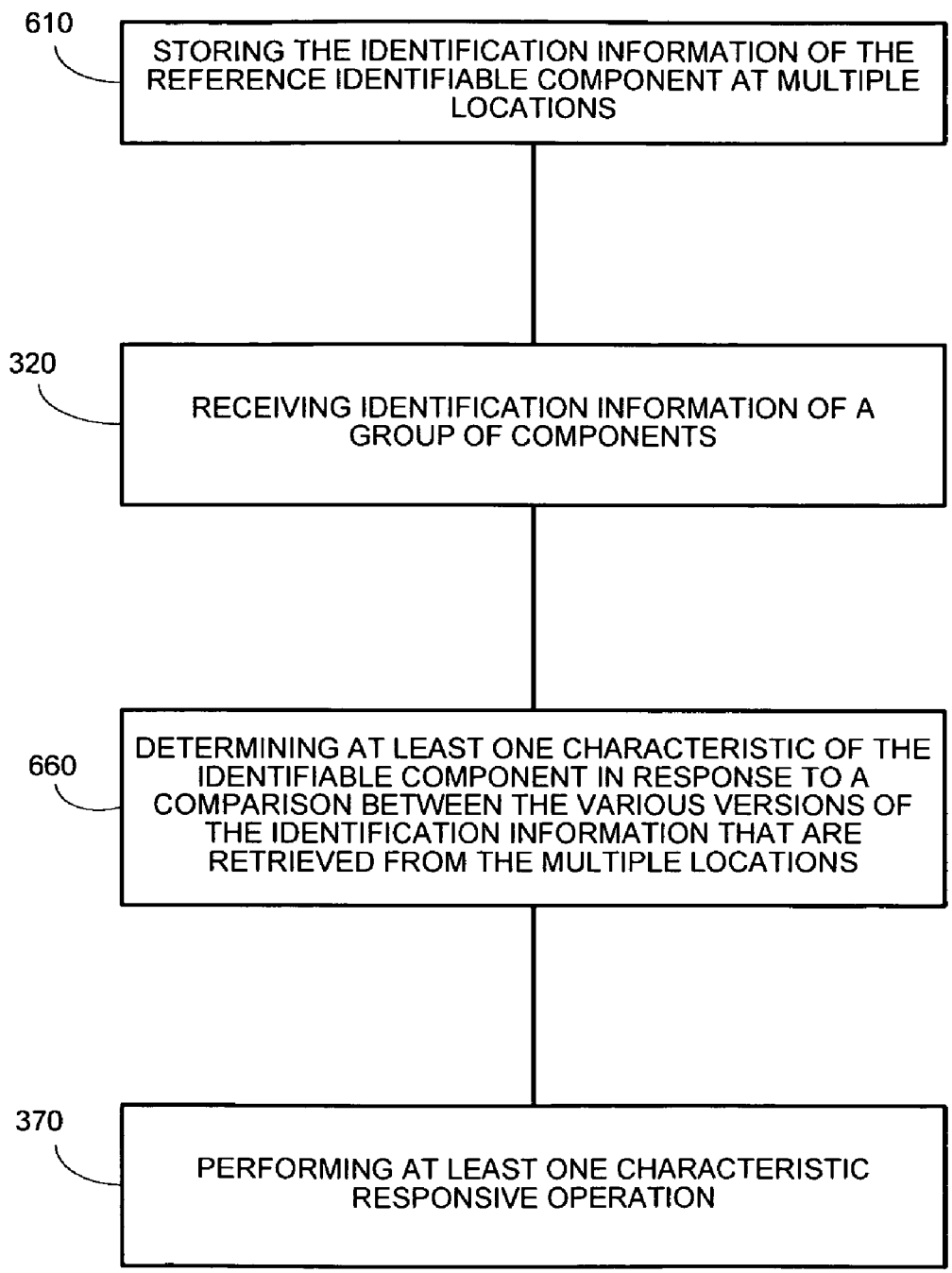

FIG. 6 is a flow chart of method 600 for determining a characteristic of an identifiable component according to an embodiment of the invention.

Method 600 starts by stage 610 of storing the identification information of the reference identifiable component at multiple locations. For example, the serial number of identifiable component 120 can be stored in each of local memory units 142, 152, 162, 172 and 182. Yet for another example, each component of the group can store its own serial number as well as the serial number of the reference identifiable component.

Stage 610 is followed by stage 320. Stage 320 is followed by stage 660 of determining at least one characteristic of the identifiable component in response to a comparison between the various versions of the identification information that are retrieved from the multiple locations. It is noted that stage 660 can also include a comparison between the identification information of the different components. Stage 660 is followed by stage 370.

Figure 7:
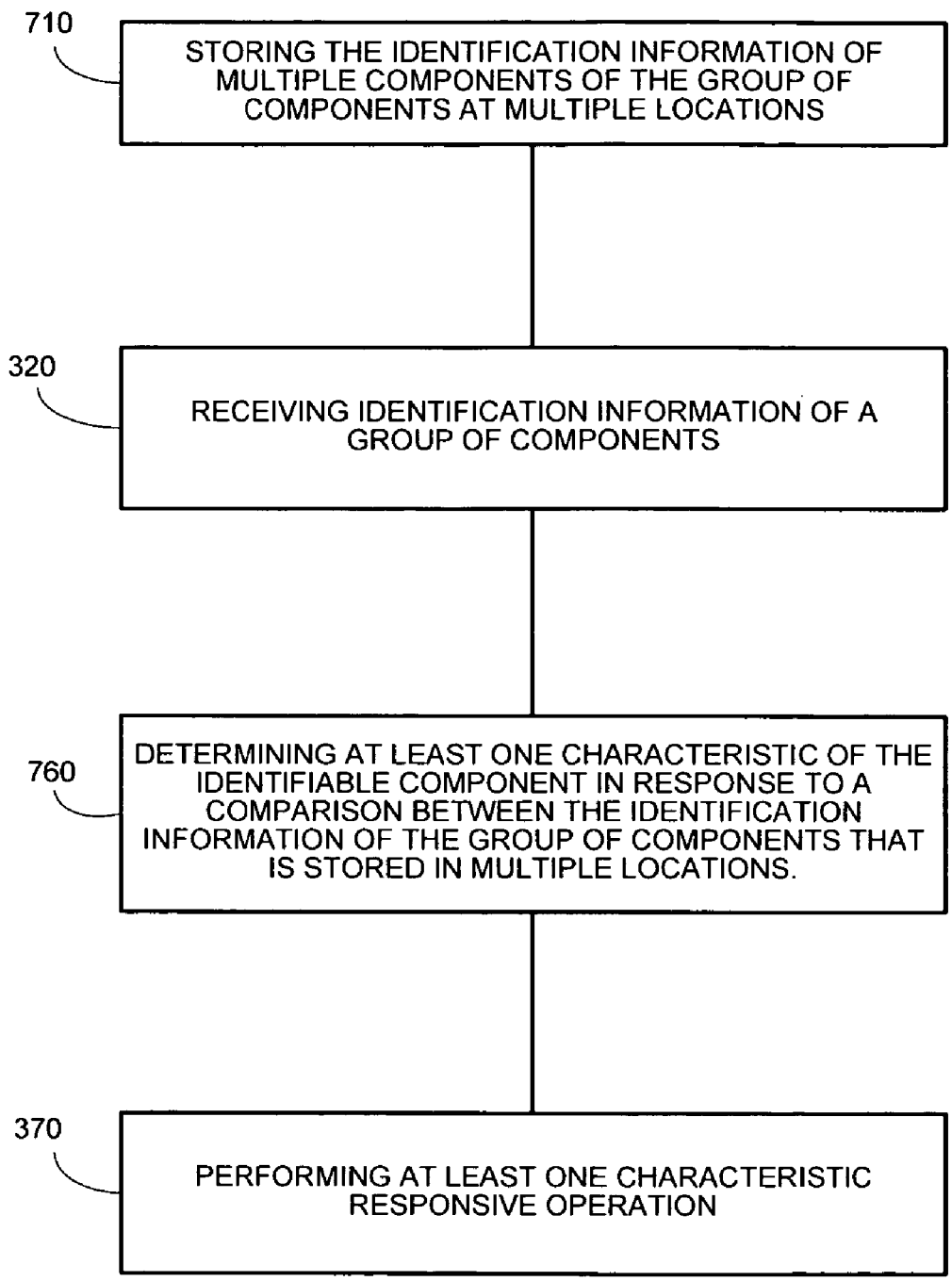

FIG. 7 is a flow chart of method 700 for determining a characteristic of an identifiable component according to an embodiment of the invention.

Method 700 starts by stage 710 of storing the identification information of multiple components of the group of components at multiple locations. For example, each component of the group can store its serial number as well as the serial numbers of other components of the group. Stage 710 is followed by stage 320.

Stage 320 is followed by stage 760 of determining at least one characteristic of the identifiable component in response to a comparison between the identification information of the group of components that is stored in multiple locations. For example, stage 760 can include comparing the serial numbers of the components as stored in multiple locations to determine whether the group of components was replaced or not.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A computer-implemented method for determining component identification, comprising:
    linking a computer system to a device having a group of components comprising an identifiable first component having a first identifier and a plurality of second components having respective second identifiers;
    storing the first identifier and the second identifier of each respective component in a local storage unit;
    executing with the computer system distinct software modules that include a component characteristic determiner, thereby causing the computer system to perform the steps of:
    receiving in the component characteristic determiner, identification information relating to an identity of at least one of the components;
    automatically establishing, responsively to the identification information, a determination policy among multiple determination policies for selection of configuration data relating to the components;
    determining whether the first identifier indicating the identifiable first component is defective;
    with the component characteristic determiner, automatically applying the determination policy to correlate selected configuration data of the second components in the storage unit to thereby determine at least one characteristic that is representative of an identity of the identifiable first component in response to the received identification information; and
    thereafter performing an operation comprising instigating a procedure selected from a group consisting of requesting a replacement for the identifiable first component, providing an alert describing a status of the device, storing the first identifier, and updating an attribute associated with the first identifier, responsively to the at least one characteristic.

2. The method according to claim 1, further comprising the step of disposing the component characteristic determiner in the device as one of the components.

3. The method according to claim 1, wherein automatically applying the determination policy comprises correlating the selected configuration data of the second components in the storage unit to thereby determine a serial number that is representative of the identity of the identifiable first component.

4. A data processing system for determining component identification, comprising:
    a memory; and a processor coupled to the memory and linked to a device having a group of components comprising an identifiable first component having a first identifier and a plurality of second components having respective second identifiers, the processor operative to store the first identifier and the second identifiers in a local storage unit of each respective component and to execute distinct software modules that include a component characteristic determiner operative to perform the steps of:

receiving in the component characteristic determiner identification information relating to an identity of at least one of the components;

automatically establishing, responsively to the identification information, a determination policy among multiple determination policies for selection of configuration data relating to the components;

determining whether the first identifier indicating the identifiable first component is defective;

with the component characteristic determiner, automatically applying the determination policy to correlate selected configuration data of the second components in the storage unit to thereby determine at least one characteristic that is representative of an identity of the identifiable first component in response to the received identification information; and thereafter performing an operation comprising instigating a procedure selected from a group consisting of requesting a replacement for the identifiable first component, providing an alert describing a status of the device, storing the first identifier, and updating an attribute associated with the first identifier responsively to the at least one characteristic.

5. The data processing system according to claim 4 wherein the second components comprise at least a portion of a group of hardware elements consisting of:
   a network;
   a server;
   a storage enclosure;
   a first server card;
   a second server card;
   a first power supply unit;
   a second power supply unit;
   a rear control panel and
   multiple disk drives.

6. The data processing system according to claim 4, wherein the component characteristic determiner is integral with the device as one of the components.

7. The data processing system according to claim 4, wherein automatically applying the determination policy comprises correlating the selected configuration data of the second components in the storage unit to thereby determine a serial number that is representative of the identity of the identifiable first component.

8. A computer software product for determining component identification, comprising a computer storage medium in which computer program instructions are stored, wherein the instructions comprise distinct modules that include a component characteristic determiner, which instructions, when executed by a computer, cause the computer to perform the steps of:

operating a device having a group of components comprising an identifiable first component having a first identifier and a plurality of second components having respective second identifiers;

storing the first identifier and the second identifiers in a local storage unit of each respective component;

receiving in the component characteristic determiner identification information relating to an identity of at least one of the components;

automatically establishing, responsively to the identification information, a determination policy among multiple determination policies for selection of configuration data relating to the components;

determining whether the first identifier indicating the identifiable first component is defective;

with the component characteristic determiner, automatically applying the determination policy to correlate selected configuration data of the second components in the storage unit to thereby determine at least one characteristic that is representative of an identity of the identifiable first component in response to the received identification information; and thereafter performing an operation instigating a procedure selected from a group consisting of requesting a replacement for the identifiable first component, providing an alert describing a status of the device, storing the first identifier, and updating an attribute associated with the first identifier responsively to the at least one characteristic.

9. The computer software product according to claim 8, further comprising the step of disposing the component characteristic determiner in the device as one of the components.

10. The computer software product according to claim 8, wherein automatically applying the determination policy comprises correlating the selected configuration data of the second components in the storage unit to thereby determine a serial number that is representative of the identity of the identifiable first component.

11. The method according to claim 1, wherein determining at least one characteristic of the identifiable first component is in response to a comparison between various versions of the identification information that are retrieved from multiple locations.

12. The data processing system according to claim 4, wherein determining at least one characteristic of the identifiable first component is in response to a comparison between various versions of the identification information that are retrieved from multiple locations.

13. The computer software product according to claim 8, wherein determining at least one characteristic of the identifiable first component is in response to a comparison between various versions of the identification information that are retrieved from multiple locations.

* * * * *